Oct. 16, 1956 S. R. KERN 2,766,748
INTAKE MANIFOLD
Filed Sept. 29, 1955
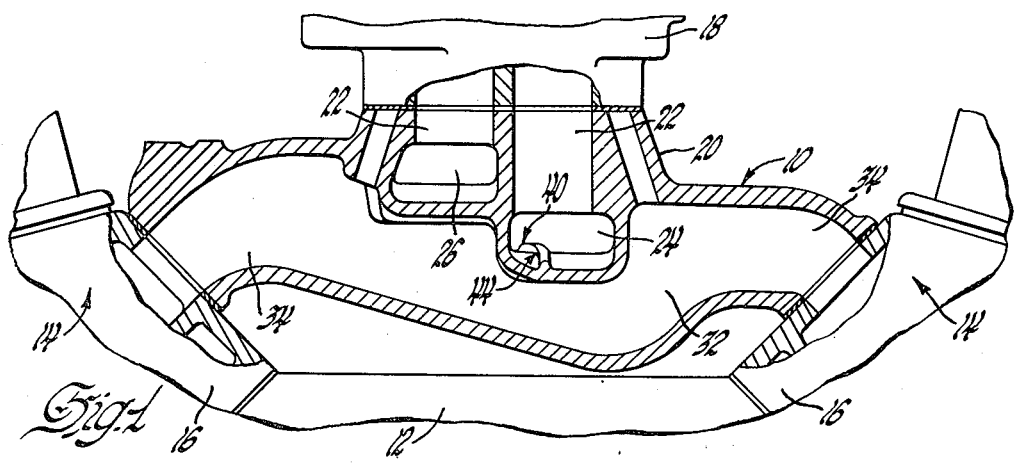
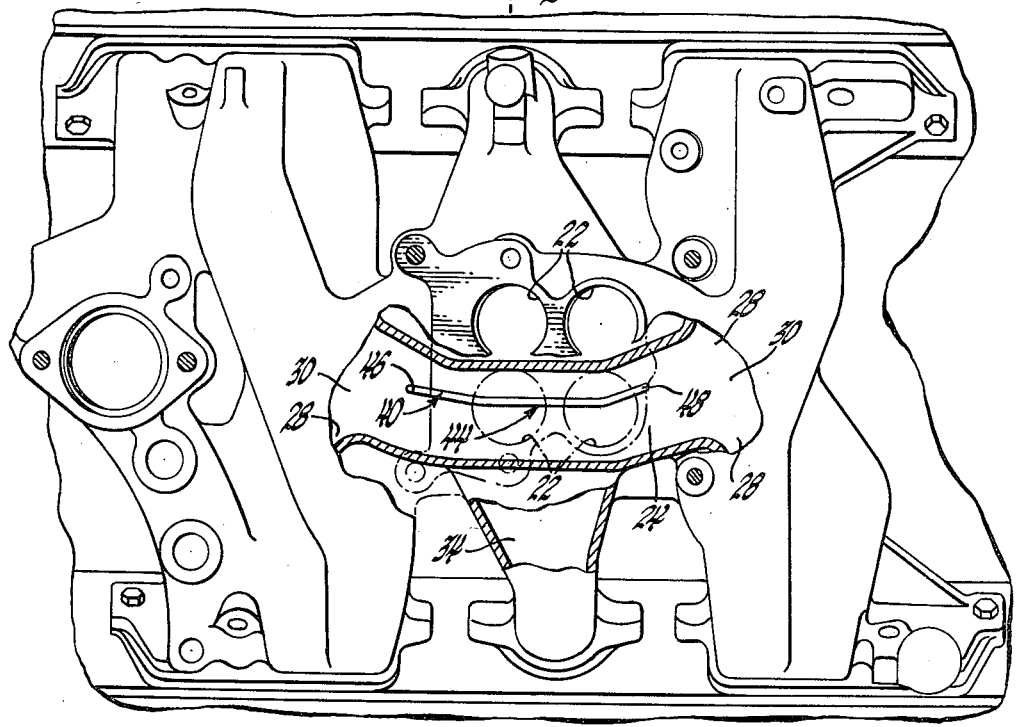
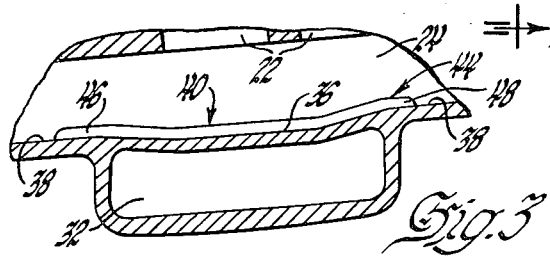
INVENTOR.
Stuart R. Kern
BY
L. D. Burch
ATTORNEY

United States Patent Office 2,766,748
Patented Oct. 16, 1956

2,766,748

INTAKE MANIFOLD

Stuart R. Kern, Pontiac, Mich., assignor to General Motors Corporation, Detroit, Mich., a corporation of Delaware Application September 29, 1955, Serial No. 537,383

11 Claims. (Cl. 123—122)

The present invention relates to intake manifolds for internal combustion engines and more particularly to means for insuring a uniform distribution of the fuel charge to the various cylinders of an internal combustion engine.

In an engine of the so-called spark ignited variety, a combustible charge is normally formed by one or more carburetors which are mounted on an intake manifold having a plurality of distribution passages therein for conveying the combustible charge to the various cylinders of the engine. There is a pronounced tendency for some of the liquid fuel particles in the charge precipitating from the charge and collecting on the bottom of the various induction passages. Most of these particles are centrifugally separated from the charge as the charge negotiates a turn while flowing from the carburetor riser passages into the distribution passages. These particles will form a stream of liquid fuel or "wet fuel" that flows along the floor of the distribution passages and into the various other induction passages. Since this liquid fuel will have a different inertia than the vaporous charge and since it flows on the floors of the surface rather than being suspended in the atmosphere, the liquid or wet fuel will not necessarily divide in the same proportions as the vaporous charge. As a result some of the cylinders may obtain more wet fuel than the other cylinders, thereby resulting in a poor fuel distribution and a corresponding decrease in fuel economy and engine performance.

It is now proposed to provide an intake manifold having means thereon effective for insuring uniform distribution of the liquid or "wet fuel" which fails to remain in the vaporous charge. This is to be accomplished by providing guide means such as a rib on a floor of an induction passage. This rib extends longitudinally of the passage in the same general direction as the charge flowing therethrough. The end portions of the rib may terminate adjacent a branch in the induction passage to divide the liquid or "wet fuel" into separate portions of the fuel in some predetermined ratio and direct these portions towards the opposite ends of the branch passages. The rib will thus insure the fuel being divided in the desired predetermined proportions and thereby insure that all of the cylinders receive their prescribed fuel charges.

In the one sheet of drawings:

Figure 1 is a fragmentary cross sectional view of an internal combustion engine employing an intake manifold embodying the present invention.

Figure 2 is a fragmentary plan view of the engine and intake manifold shown in Figure 1.

Figure 3 is a vertical cross sectional view of a portion of the intake manifold in Figures 1 and 2.

Referring to the drawings in more detail, the present invention may be embodied in an intake manifold 10 suitable for use on an internal combustion engine 12. In the present instance this engine 12 is of the so-callled V-type employing a pair of angularly disposed banks 14 of cylinders with cylinder heads 16 secured thereon to form the combustion chambers of the engine 12. These cylinders may be charged through inlet passages that extend through the cylinder heads 16 to form intake ports on the inner sides thereof.

In order to form a combustible charge for the engine 12, an induction system having an intake manifold 10 and a carburetor 18 mounted thereon may be provided in the space between the two banks 14 of cylinders. The present carburetor 18 which is of the so-called downdraft variety, is mounted on top of a carburetor riser 20 projecting vertically from the center of the intake manifold 10. This carburetor riser 20 includes vertical riser passages 22 that register with the mixture forming passages in the carburetor to receive the charge therefrom. In the present instance there are two separate sets of these riser and mixture forming passages with each set including a primary and a secondary passage. The intake manifold 10 includes separate distributing passages 24 and 26 which extend generally longitudinally of the intake manifold 10 immediately below the riser passages 22 so that the center portion of each distribution passage 24 and 26 will be interconnected with the lower end of one of the riser passages 22. In addition, separate branch passages 28 may extend transversely of the intake manifold 10 with the centers thereof being connected to the opposite ends of the distributing passages 24 and 26 to form junctions 30 therebetween. The ends of the branches 28 form outlets to charge the inlet ports. One distribution passage 26 is preferably disposed above the other so that the branch passages 28 may be crisscrossed. It will be seen that each distribution passage 24 and 26 and its associated branch passages are interconnected to form an H-shaped network of induction passages that charge the two end cylinders on one side and the two center cylinders on the other side. Each of these H-shaped networks is substantially independent of each other.

During operation of the engine 12 the air will flow vertically down through the charge forming passages in the carburetor where it will be mixed with atomized particles of fuel. This combustible charge of air and fuel particles will then flow vertically downwardly through the riser passages 22 and into the centers of the distribution passage 24 and 26 and horizontally towards the opposite ends of the distribution passages. As the charge enters the junctions 30 and flows into the centers of the branch passages 28, it will again divide and flow to the opposite ends of the branch passages 28 and into the intake ports in the cylinder heads.

Under certain engine operating conditions and particularly when the engine is below normal operating temperatures, the fuel mixture is exceptionally rich, etc., there will be a tendency for some of the fuel particles present in the charge to drop therefrom and collect on the walls of the distribution passages to form a stream of liquid fuel. It should be noted that when the charge flows from the vertical riser passage 22 and into the horizontal distribution passage 24 and 26, it must negotiate a right-angle turn. As a result most of the heavier particles of liquid or unevaporated fuel will be centrifugally separated from the charge in and around the intersection of the riser and distribution passages. A heat box 32 may be provided around the intersection so that hot engine exhaust gases may flow through a crossover passage 34 and heat the particles of liquid fuel and cause a re-evaporation thereof back into the charge. Although this application of heat does assist in the re-evaporation of the liquid fuel, it does not result in an immediate and complete re-evaporation into the charge. Accordingly, shallow depressions or pockets 36 may be formed in the floors 38 of the distribution passages 24 and 26 to collect the liquid fuel and thus form a puddle of fuel that is in heat exchanging relation with gases in the heat box 32. However, when the fuel collects in the pockets 36 faster than it evaporates, the surplus fuel will overflow along the floors 38 of the distribution passages 24 and 26 and be blown therealong in the same general direction as the charge. As the liquid fuel reaches the junctions 30 between the distribution passages 24 and 26 and branch passages 28, it will divide into separate portions or quantities which will flow along the branch passages 28 and into the intake passages in the cylinder heads. Due to various factors such as the inclination of the distribution passages 24 and 26 and branch passages 28, the firing order etc., the proportions by which the fuel flow divides may vary from one branch passage 28 to another and, consequently, result in a non-uniformity of the charging of the various cylinders.

In order to insure that the various quantities of fuel divide in the desired proportions, guide means 40 may be provided on the floor 38 of the distribution passage 24. In the present instance this guide means 40 includes a rib 44 which extends longitudinally of the distribution passage 24 in the same general direction as the flow and projects upwardly from the floor 38 of the distribution passage 24. This rib 44 preferably does not project high enough to have any material effect on the flow of the vaporous charge, although it is of sufficient height to substantially prevent the liquid fuel on the floor 38 of the distribution passage 24 flowing thereover. The rib 44 extends completely across the depression 36 and has end portions 46 and 48 that extend therebeyond so as to terminate adjacent the junctions 30 between the distribution passage 24 and the branch passages 28. Although the exact location of the rib 44 may vary from one installation to another, it has been found preferable to place the rib 44 in substantial alignment with the riser passages 22 rather than in the exact center of the distribution passage 24. Thus the shower of liquid fuel striking the floor 38 of the distribution passage 24 will be more evenly divided about the rib 44 even though the vaporous charge is not. The end portions 46 and 48 of the rib 44 are preferably positioned to direct the quantities of wet fuel flowing into the branch passages 28 to flow towards the opposite ends thereof in the desired proportions for producing uniform charging of the cylinders. Although the exact position of the ends 46 and 48 varies from one installation to another, the ends are preferably disposed to produce a marked division of the quantities of the fuel as the fuel flows towards the branch passages.

Although a single embodiment has been illustrated and described herein, it will be apparent to those skilled in the art that the invention may be embodied in numerous other specific forms without departing from the true spirit thereof. For example, it is quite apparent that although the invention is shown on a V-type engine, it may be equally well adapted for use on an in-line or any other form of engine. In addition, the exact location of the rib may vary and the directions of the end portions may also be modified and that additional ribs may be employed at any junctions in an intake manifold where there is a poor distribution of the liquid fuel. It is therefore to be understood that the present invention is not to be limited by the foregoing illustration and description but only by the scope of the claims which follow.

I claim:

1. An intake manifold for an internal combustion engine having a plurality of cylinders comprising a supply passage for supplying a combustible charge of air and fuel, a distribution passage interconnected with said supply passage for conveying said charge therefrom, a branch passage interconnected with an end of said distribution passage to form a junction therebetween, the opposite ends of said branch passage extending away from said junction for conveying said charge to said cylinders, guide means on the bottom of said distribution passage extending longitudinally thereof in substantially the same general direction as the flow of said charge, said guide means including an end portion adjacent said junction positioned to divert separate quantities of the liquid fuel flowing on said bottom into said branch passage in some predetermined ratio.

2. An intake manifold for an internal combustion engine having a plurality of cylinders, said manifold comprising a carburetor riser having a riser passage extending therethrough for allowing a combustible charge of fuel and air to flow therethrough, a distribution passage interconnected with said riser passage and including a generally horizontal floor on the bottom thereof for receiving liquid fuel from said charge, a branch passage forming a junction with one end of said distribution passage and extending in opposite directions therefrom, guide means disposed on said floor and extending longitudinally thereof in substantially the same general direction as the flow of said charge, said guide means including an end portion adjacent said junction positioned to divide the flow of liquid fuel along said floor into quantities having a predetermined ratio and diverting said quantities into said branch passage.

3. An intake manifold for an internal combustion engine having a plurality of cylinders, said manifold comprising a carburetor riser having a substantially vertical riser passage for allowing a combustible charge of fuel and air to flow downwardly therethrough, at least one distribution passage interconnected with the lower end of said riser passage for allowing said charge to flow therethrough, said distribution passage including a generally horizontal floor positioned on the bottom thereof with a central portion thereof positioned in substantial alignment with said riser passage to receive liquid fuel from said charge, at least one branch passage forming a junction with one end of said distribution passage and extending in opposite directions therefrom, a rib disposed on said floor and having a part thereof extending across said central portion in the same general direction as the flow of said charge, said rib also including an end portion terminating adjacent said junction and being positioned to divide the flow of fuel along said floor into separate quantities having a predetermined ratio and diverting said separate quantities into said branch passage.

4. An intake manifold for an internal combustion engine having a pair of angularly disposed banks of cylinders charged through inlet ports in the sides of said engine, said manifold comprising a carburetor riser in the middle thereof adapted to have a carburetor mounted thereon and including a substantially vertical riser passage for receiving a combustible charge of fuel particles and air from said carburetor, a substantially horizontal distribution passage having the center thereof communicating with the lower end of said riser passages for receiving the charge from said riser passage and including a floor on the bottom thereof for receiving liquid fuel from said charge, branch passages extending transversely through said manifold with the opposite ends thereof forming outlets in the sides of said manifold to communicate with said inlet ports for delivering said charge thereto, each end of said distribution passages intersecting the center portion of one of said branch passages to form a junction therebetween, a guide extending longitudinally of said distribution passage in the same general direction as the flow of charge therethrough, the opposite ends of said guide means terminating adjacent said junctions and being positioned to provide a predetermined division of liquid fuel flowing along the floor of said distribution passages and into said branch passages.

5. An intake manifold for an internal combustion engine having a pair of angularly disposed banks of cylinders charged through inlet ports in the sides of said engine, said manifold comprising a carburetor riser in the middle thereof adapted to have a carburetor mounted thereon and including substantially vertical riser passages for receiving a combustible charge of air and fuel particles from said carburetor, a distribution passage having the center thereof communicating with the lower end of said riser passages for receiving the charge from said riser passages, a floor on the bottom of said distribution passage for receiving liquid fuel from said charge, branch passages extending transversely through said manifold with the opposite ends thereof forming outlets in the sides of said manifold to communicate with said inlet ports for delivering said charge thereto, each end of said distribution passage intersecting the center of one of said branch passages to form a junction therebetween, a rib on said floor of said distribution passage projecting upwardly into said distribution passage and extending longitudinally thereof in the same general direction as the flow of said charge, the opposite ends of said rib terminating adjacent said junction and being positioned to provide some predetermined division of the liquid fuel on said floor into separate quantities and causing said quantities to be diverted into said branch passages towards the ends thereof.

6. An intake manifold for an internal combustion engine having a pair of angularly disposed banks of cylinders charged through inlet ports in the sides of said engine, said manifold comprising a carburetor riser in the middle thereof adapted to have a carburetor mounted thereon and including a substantially vertical riser passage for receiving a combustible charge of air and fuel particles from said carburetor, a distribution passage having the center thereof interconnected with the lower end of said riser passage for receiving the charge from said riser passage, branch passages extending transversely through said manifold with the opposite ends thereof forming outlets in the sides of said manifold to communicate with said ports for delivering said charge thereto, each of the ends of said distribution passage intersecting the center of one of said branch passages to form a junction therebetween, the bottom of said distribution passage including a floor having a shallow depression in the center thereof in substantial alignment with said riser passage, a rib extending longitudinally of said distribution passage and across said depression in the same general direction as the flow of said charge, the opposite ends of said rib being positioned outside of said depression and terminating adjacent said junctions for diverting predetermined portions of the liquid fuel flowing along said floor towards the opposite ends of said branch passages.

7. An intake manifold for an internal combustion engine having a pair of angularly disposed banks of cylinders charged through inlet ports in the sides of said engine, said manifold comprising a carburetor riser in the middle thereof adapted to have a carburetor mounted thereon and including a pair of substantially parallel, vertical riser passages for receiving a combustible charge of fuel particles and air from said carburetor, a substantially horizontal distribution passage having the center thereof intersecting the lower ends of said riser passages for receiving said charge therefrom, branch passages extending transversely through said manifold with the opposite ends thereof forming outlets in the sides of said manifold to communicate with said ports for delivering said charge thereto, the ends of said distribution passage intersecting the centers of said branch passages to form junctions therebetween, a rib on said floor extending longitudinally of said distribution passage in the same general direction as the flow of said charge, the center of said rib being disposed in substantial alignment with the axes of said riser passages, the opposite ends of said rib terminating adjacent said junctions and being positioned to divert equal portions of the liquid fuel flowing along said floor toward the opposite ends of said branch passages.

8. An intake manifold for an internal combustion engine having a pair of angularly disposed banks of cylinders charged through inlet ports in the sides of said engine, said manifold comprising a carburetor riser in the middle thereof adapted to have a carburetor mounted thereon and including a pair of substantially parallel, vertical riser passages for receiving a combustible charge of fuel particles and air from said carburetor, a substantially horizontal distribution passage having the center thereof intersecting the lower ends of said riser passages for receiving said charge therefrom, branch passages extending transversely through said manifold with the opposite ends thereof forming outlets in the sides of said manifold to communicate with said ports for delivering said charge thereto, the ends of said distribution passage intersecting the centers of said branch passages to form junctions therebetween, the bottom of said distribution passage comprising a floor having a shallow depression in the center thereof in substantial alignment with said riser passages, a rib on said floor extending longitudinally across said depression in the same general direction as the flow of said charge with the center thereof being disposed in substantial alignment with the axes of said riser passages, the opposite ends of said rib terminating adjacent said junctions and being positioned to divert equal portions of the liquid fuel flowing along said floor toward the opposite ends of said branch passages.

9. An intake manifold for an internal combustion engine having cylinders charged through inlet ports and having exhaust ports for engine exhaust gases, said intake manifold comprising a riser passage for receiving a combustible charge of air and fuel particles, a distributing passage interconnected with said riser passage for receiving said charge and having a floor with a portion thereof disposed in substantial alignment with said riser passage to allow said fuel particles from said riser passage to collect thereupon, an exhaust passage extending through said manifold and adapted to be interconnected with said exhaust port, said exhaust passage forming a heat box in heat exchanging relation with the intersection of said riser and distribution passages for heating said collected fuel particles, a branch passage having the center thereof interconnected with an end of said distribution passage to form a junction therebetween, the opposite ends of said branch passage extending in opposite directions for conveying said charge to said inlet ports, a rib extending longitudinally of said distribution passage in the same general direction as the flow of said charge therethrough, an end portion of said rib extending beyond said heat box and terminating adjacent said junction for causing a predetermined distribution of the liquid fuel particles flowing along said floor into said branch passage.

10. In an intake manifold for an internal combustion engine having cylinders charged through inlet ports and having exhaust ports for the engine exhaust gases, said intake manifold comprising a substantially vertical riser passage for receiving a combustible charge of air and fuel particles from a carburetor, a distributing passage interconnected with the lower end of said riser passage for receiving said charge and having a substantially horizontal floor with a central portion thereof disposed in substantial alignment with said riser passage to allow said fuel particles from said riser passage to collect thereupon, an exhaust passage extending transversely through said manifold below said distribution passage and being adapted to be interconnected with said exhaust ports to form a heat box in heat exchanging relation with said central portion of said floor for heating said fuel particles thereon, branch passages having the centers thereof interconnected with the end of said distribution passage to form junctions therebetween, the opposite ends of said branch passages extending in opposite directions from said junctions for conveying said charge to said inlet ports, a rib extending longitudinally of said distribution passage in the same general direction as the flow of said charge therethrough, the center of said rib extending entirely across said heated central portion of said floor in substantial alignment with the axis of said riser passage, the end portions of said rib extending beyond said heated central portion and terminating adjacent said junction for causing a predetermined distribution of the liquid fuel particles flowing along said floor into said branch passages.

11. An intake manifold for an internal combustion engine having cylinders charged through inlet ports and having exhaust ports for the engine exhaust gases, said intake manifold comprising a pair of parallel, substantially vertical riser passages for receiving a combustible charge of air and fuel particles from a carburetor, a distribution passage interconnected with the lower end of said riser passages for receiving said charge and having a substantially horizontal floor on the bottom thereof, said floor including a depressed portion in the center thereof disposed in substantial alignment with said riser passages to allow fuel particles from said charge to collect therein, an exhaust passage extending through said manifold below said distributing passage and adapted to be interconnected with said exhaust ports, said exhaust passage forming a heat box in heat exchanging relation with said depressed portion of said floor for heating the fuel particles collected therein, branch passages having the centers thereof interconnected with the opposite ends of said distribution passages to form junctions therebetween, the opposite ends of said branch passages extending in the opposite directions from said junctions for conveying said charge to said inlet ports, a rib extending longitudinally of said distribution passage in the same general direction as the flow of said charge therethrough, the center of said rib extending across said depressed portion and being disposed in substantial alignment with the axes of said riser passages, the opposite ends of said rib extending beyond said depressed portion and terminating adjacent said junctions for causing equal distribution of the liquid fuel particles flowing along said floor and into said branch passages.

References Cited in the file of this patent

UNITED STATES PATENTS

| | | |
|---|---|---|
| 1,771,886 | Fekete et al. | July 29, 1930 |
| 1,916,500 | Summers | July 4, 1933 |
| 2,043,079 | Timian | June 2, 1936 |
| 2,068,117 | Timian | Jan. 19, 1937 |